United States Patent
Page et al.

(10) Patent No.: US 7,519,652 B2
(45) Date of Patent: Apr. 14, 2009

(54) DISTRIBUTED APPLICATION SERVER AND METHOD FOR IMPLEMENTING DISTRIBUTED FUNCTIONS

(75) Inventors: David Charles Page, Wellington (NZ); David Ian Ferry, Wellington (NZ)

(73) Assignee: Open Cloud Limited, Wellington (NZ)

( * ) Notice: Subject to any disclaimer, the term of this patent is extended or adjusted under 35 U.S.C. 154(b) by 0 days.

(21) Appl. No.: 10/512,344

(22) PCT Filed: Apr. 24, 2003

(86) PCT No.: PCT/NZ03/00071

§ 371 (c)(1),
(2), (4) Date: Feb. 10, 2006

(87) PCT Pub. No.: WO03/091892

PCT Pub. Date: Nov. 6, 2003

(65) Prior Publication Data

US 2006/0195525 A1    Aug. 31, 2006

(30) Foreign Application Priority Data

Apr. 24, 2002    (NZ) ..................... 518575

(51) Int. Cl.
*G06F 15/16*     (2006.01)
*G06F 15/177*    (2006.01)
*G06F 7/00*      (2006.01)
*H04L 12/42*     (2006.01)

(52) U.S. Cl. ................. 709/201; 709/203; 709/221; 370/450; 707/10

(58) Field of Classification Search .............. None
See application file for complete search history.

(56) References Cited

U.S. PATENT DOCUMENTS

| 4,689,815 | A  * | 8/1987  | Grewal et al. ............... 379/269 |
| 4,924,384 | A    | 5/1990  | Hao et al. |
| 5,341,374 | A  * | 8/1994  | Lewen et al. ................ 370/450 |
| 6,108,699 | A  * | 8/2000  | Moiin ........................ 709/221 |
| 6,327,630 | B1   | 12/2001 | Caroll et al. |
| 6,490,586 | B1 * | 12/2002 | Goft et al. ..................... 707/10 |
| 6,715,100 | B1 * | 3/2004  | Hwang .......................... 714/5 |
| 6,898,791 | B1 * | 5/2005  | Chandy et al. .............. 719/314 |
| 7,221,660 | B1 * | 5/2007  | Simonson et al. ........... 370/312 |
| 2002/0032754 | A1 | 3/2002 | Logston et al. |
| 2002/0143855 | A1 * | 10/2002 | Traversat et al. ............ 709/202 |

FOREIGN PATENT DOCUMENTS

| EP | 1 117 045 A2 | 1/2001 |
| WO | WO 01/40903 A2 | 6/2001 |

* cited by examiner

*Primary Examiner*—Wen-Tai Lin
(74) *Attorney, Agent, or Firm*—Finnegan, Henderson, Farabow, Garrett & Dunner, L.L.P.

(57) ABSTRACT

The invention provides a distributed application server comprising a cluster of two or more nodes in a peer configuration. The two or more nodes are associated with at least one message stream comprising a plurality of messages propagated through the associated nodes. The invention also provides a method of implementing a distributed application server comprising the steps of arranging a cluster of two or more nodes in a peer configuration and associating the nodes with at least one message stream.

9 Claims, 7 Drawing Sheets

DISTRIBUTED APPLICATION SERVER AND METHOD FOR IMPLEMENTING DISTRIBUTED FUNCTIONS

FIELD OF INVENTION

This invention relates to application servers and in particular to a fault tolerant distributed application server suitable for use in an integrated network and to a method of implementing the various functions that a distributed application server supports.

BACKGROUND TO THE INVENTION

In broad terms an application server is an information system that provides the run-time environment for applications.

Generally speaking, the applications hosted by application servers handle transactions between an organisation's database servers and/or back and business applications and any end users or clients who wish to access those resources.

FIG. 1 shows a simplified scenario in which one or more clients 110 may access central computing resources 120 via an application server 130. A client may be, for example, a workstation operating under appropriate operating system and application software. Client requests may require the application server to access one or more resources, for example an object database 120A, a relational database 120B, or an external application 120C. This type of arrangement may be satisfactory for a small business with centralised resources which several employees need to access from their workstations.

However, in today's environment, especially with the popularity of the Internet and a growing array of other wireless and telecommunications networks, more and more organisations are offering services to consumers over traditional WAN's, wireless network and wireline networks via an application server. These services could include, for example, access to a private database over the Internet or in the context of the telecommunications services call forwarding services from a client's home phone to mobile phone or voice mail access. Consumers of such services are creating a high demand for new services that integrate features from the Internet, wireless and wireline networks. Application server technology is becoming increasingly complex to keep pace with these consumer demands.

There is considerable pressure for application servers to be highly available, highly scalable, fault tolerant, and to facilitate the rapid development of next generation services for clients and consumers. It would be useful to have a distributed application server that was highly scalable, fault tolerant, portable and standardised and that was suitable for service provisioning in an integrated network.

SUMMARY OF INVENTION

In broad terms in one form, the invention comprises a distributed application server comprising a cluster of two or more nodes in a peer configuration, the two or more nodes associated with at least one message stream comprising a plurality of messages propagated through the associated nodes.

In broad terms in another form the invention provides a method of implementing a distributed application server comprising the steps of arranging a cluster of two or more nodes in a peer configuration; and associating the nodes with at least one message stream.

BRIEF DESCRIPTION OF THE FIGURES

Preferred forms of the distributed application server and method of implementing distributed functions will now be described with reference to the accompanying figures in which.

DETAILED DESCRIPTION OF THE INVENTION

Application servers range from small footprint, web-based processors for intelligent appliances or remote-embedded devices, to complete environments for assembling, deploying and maintaining scalable multi-tier applications across an enterprise.

Individual application servers are the building blocks of the invention. It is envisaged that almost any appropriate type of application server could serve as the basis for the invention.

Figure 1:
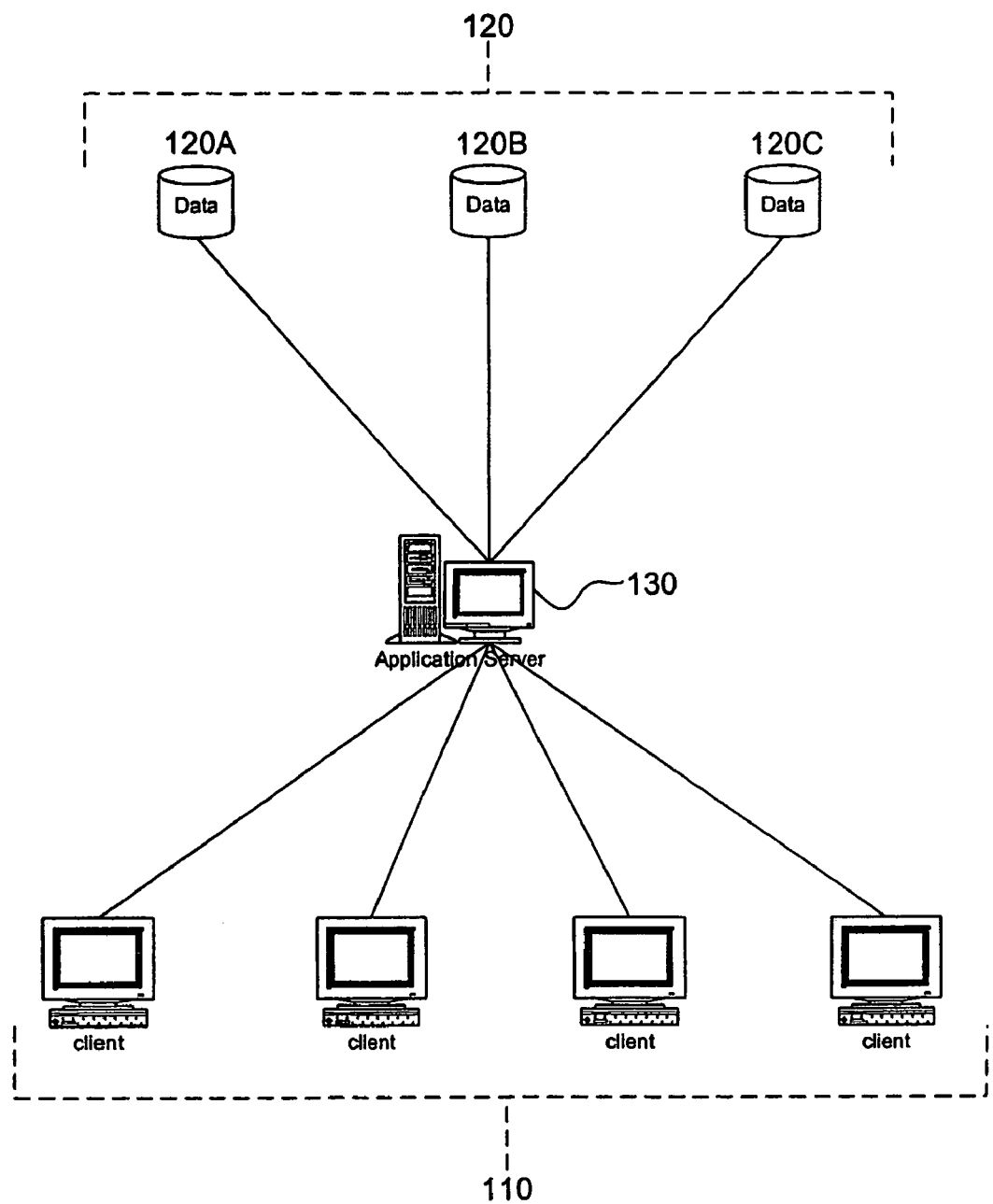
FIG. 1 is a diagram of a prior art simple instance of an application server.
Figure 2:
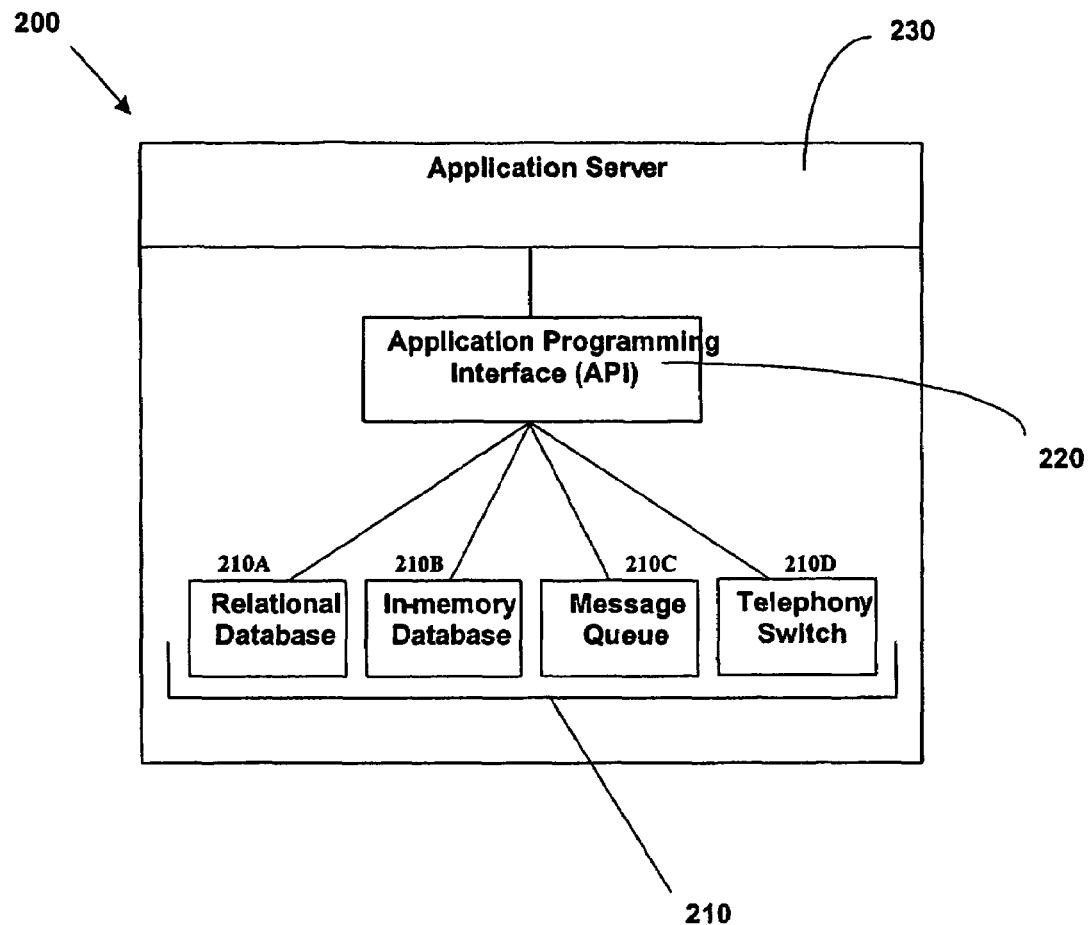
FIG. 2 is a diagram of a preferred architecture for a single application server.

FIG. 2 shows a simplified representation of a typical single application server, by way of example only. The resources accessible to a client through the application server may include one or more transactional and non-transactional resources 210, for example relational databases 210A, in memory databases 210B, message queues 210C, or switches 210D. The particular resources 210 will differ from server to server.

In terms of software, the application server comprises a suite of software that helps programmers isolate the business logic in their programs from the platform-related code. Application servers can handle all of the application logic and connectivity found in client server applications.

What this means is that methods for accessing resources 210 are defined in the server's suite of software and may be accessed via an API or application programming interface. An API defines an interface to the specific predefined methods by which a programmer writing the application program can make requests of the operating system or other system resources. In using the API a programmer can often ignore any peculiarities of the platform or structure of the databases or other legacy systems that comprise resources 210 since the functionality that deals with these peculiarities is provided by the server software.

Typically the applications hosted by an application server will be component-based. A component is a software object that encapsulates certain functionality or a set of functionalities and is designed to interact with other components. A component has a clearly defined interface and conforms to a prescribed behaviour common to all components within an architecture. Multiple components may be put together to build other components. Large software systems can be built by integrating pre-existing software components. A component-based application is, therefore, software that is composed of one or more components that conforms to a prescribed behaviour common to all components within an architecture.

Typically the API will define the interface for developers to build such component-based functionality. Typically therefore, it is the application components that access the system resources 210, as mentioned above. At a high level of abstraction then, an application server may be considered in terms of a set of functions that it implements to support the execution of the applications the server hosts.

On an application server, a very important function commonly supplied via the API is support for transactions. A transaction is a unit of interaction with a database management system or a similar resource. It must be treated in a coherent and reliable way independent of other transactions. A transaction is comprised of one or more software queries or instructions grouped together into an atomic unit of work that must succeed or fail as a whole. When managing transactions it is important to ensure that all resources updated by a transaction requested by an application are always left in a consistent state. In particular, all changes made by one user within a transaction should be isolated from changes made by other users running simultaneously.

Since multiple application components and system resources 210 may participate in a transaction, it is important to establish and maintain the state of the transaction as it occurs. This information is usually kept in a transaction context. A transaction context is an association between the transactional operations or functions on the resources and the components evoking the operations.

Some examples of application servers that provide particularly effective runtime environments for component-based applications which may execute within a transactional context include servlet engines, J2EE servers and JAIN SLEE servers.

In one preferred embodiment the application server of the invention will leverage functionality from an API that is compliant with the JAIN SLEE (Service Logic Execution Environment) API specification. This specification is portable across vendor equipment and diverse types of network and is standardised, thereby allowing a large body of developers to build services that utilise a given set of specialised equipment without a large amount of specialised knowledge. The JAIN SLEE API is especially applicable to integrated networks and more specifically telecommunications network services.

While the JAIN SLEE specification is preferred for the invention, any API specification, particularly one that provides interfaces to diverse types of network, allows for simplified access to diverse protocols and is portable across vendor equipment, would be an appropriate base for the API of the invention. Likewise, although the JAVA programming language is the preferred language of development for the invention, any programming language offering the same level of portability would be equally appropriate.

It is also envisaged that the application server of the invention 230 should be fault tolerant. Fault tolerant means that if there should be a failure somewhere on the server the server is nevertheless able to continue processing the client requests. Fault tolerance is often achieved through what is known as clustering.

A cluster is essentially a group of one or more application server instances (as illustrated in FIG. 2) where each instance is individually addressable. Each instance is called a node and may be reified as one or more processes. An application server cluster may be deployed on one or more computing resources or machines on a network.

Server nodes are typically connected by a backbone creating a distributed application server. The nodes of the cluster communicate by sending messages to each other via the backbone. State and function information that exists on one node is replicated in at least one of the remaining nodes in the cluster. This redundancy protects clients from application server system failure. Since the application server resources are distributed across the nodes of the cluster, if one node fails then in theory another node is able to take over and finish processing the client request. This is known as failover.

However, current clustered application servers typically have a master/slave configuration wherein one node in the cluster is responsible for coordinating work on the cluster. In a master/slave configuration, if the master node fails then failover is much more difficult to achieve. The same is true of cluster configurations in which some nodes have special capabilities or access to particular resources that other nodes in the configuration do not have. In this scenario if the node with the critical capability should fail, failover is practically impossible.

Figure 3:
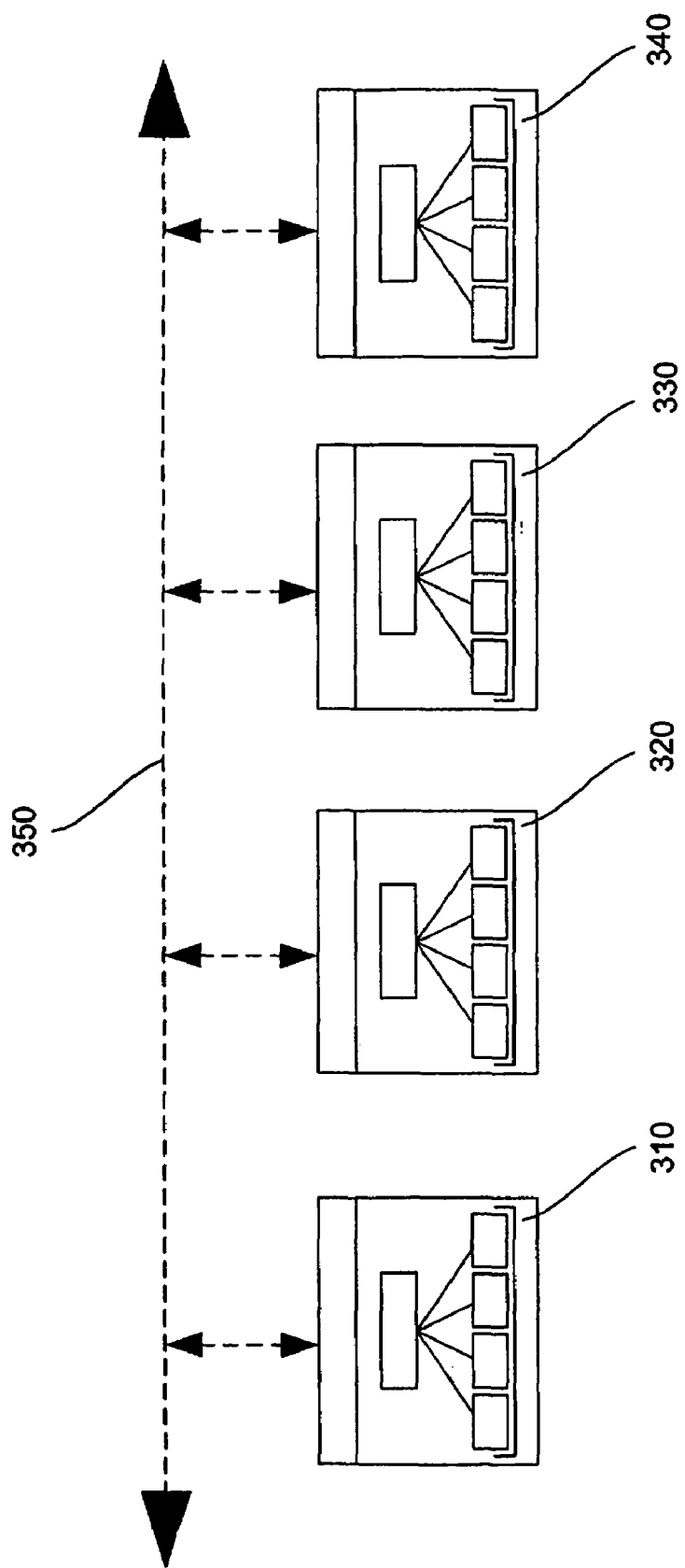
FIG. 3 is a diagram of a cluster-based distributed application server in a configuration of peers in accordance with the invention.

By comparison, the cluster configuration of the invention is a configuration of peers rather than of master/slave. FIG. 3 illustrates a preferred cluster configuration of peers arranged according to the invention. The cluster includes two or more application server nodes indicated at 310, 320, 330 and 340 respectively. Each node is preferably similar in configuration to the application server of FIG. 2.

In the peer configuration of the invention each node is capable of providing the same set of functions as every other node and no node has any special responsibilities. In this way any single point of failure is eliminated and failover can be guaranteed as long as there are nodes functioning on the cluster.

The cluster server nodes of the invention interact via one or more message streams, for example 350. A preferred form message stream comprises messages generated by and propagated through the nodes in the network. A node receives messages from a message stream and may also place messages into the message stream. A node that is associated with a particular stream is said to be a member of the stream.

A message on a message stream will generally pertain to an occurrence of significance that has occurred (an event). An event usually indicates a task that must be completed by the application server.

The activities of a server are driven by events. An activity is generally comprised of a related stream of events. For example, on a telecommunications application server an activity might be a call to access voicemail. The process of allowing a user access to the voicemail system involves a great number of events, all of which are related to the activity of the voicemail access of that particular user in that particular session.

On a distributed server, all events that are received must be routed for processing. Typically, only a subset of all the nodes in the application server of the invention is made responsible for handling a particular event. This subset of the server nodes in the cluster will interact via its own message stream.

Figure 4:
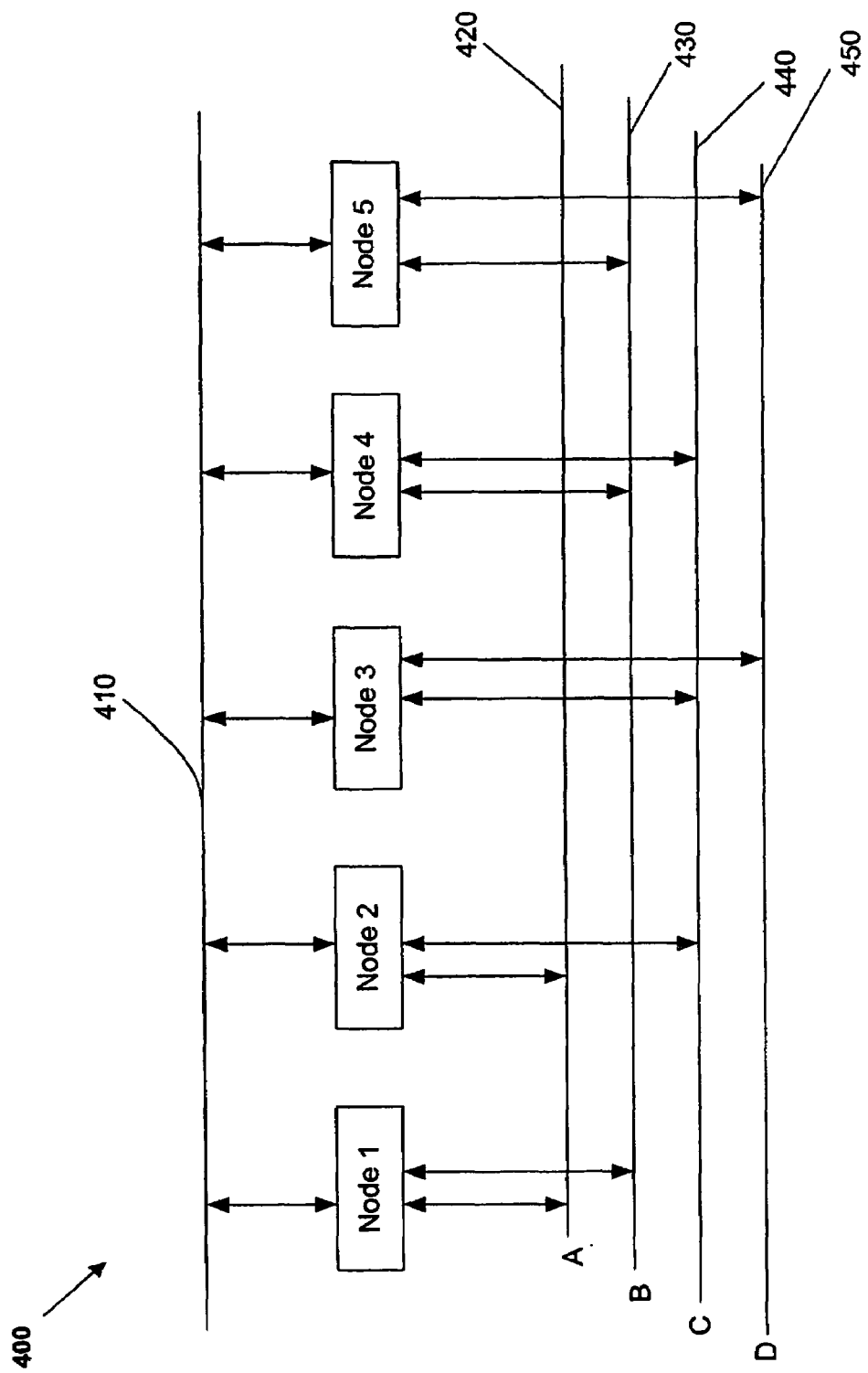
FIG. 4 is a diagram of a cluster-based distributed application server in which the nodes have been associated with one or more message streams in accordance with the invention.

FIG. 4 illustrates a cluster 400 made up of five nodes Node 1, Node 2, Node 3, Node 4, and Node 5. In the application server shown in FIG. 4, one message stream 410 is associated with all nodes 1 to 5. The cluster further includes four message streams with which only a subset of the nodes are associated, namely Message Stream A, Message Stream B, Message Stream C, and Message Stream D shown at 420, 430, 440 and 450 respectively.

Nodes 1 and 2 are both members of and associated with Message Stream A. Nodes 1, 4, and 5 are all members of Message Stream B. Nodes 2, 3, and 4 are members of Message Stream C while Nodes 3 and 5 are members of Message Stream D.

Typically all event messages that relate to a particular activity will be sent on the same message stream and thus will be processed by the same subset of nodes on the server cluster. Thus the activity context is propagated to all nodes that are associated with the particular message stream and which are therefore processing the particular activity.

In the application server of the invention, the messages on each message stream are always delivered to each of the nodes on the message stream in a particular "order". Each node that is a member of a message stream receives every event in that same order unless one of the nodes has failed. This means for example, that if Node 1 in FIG. 4 were to receive message 1, message 2, and message 3 in that order on Message stream A, then Node 2 should receive message 1 followed by message 2 followed by message 3. If there were any other nodes associated with message stream A then they would also receive message 1, message 2, and message 3 in that order. This guaranteed delivery of messages in the same order by all nodes that are a member of a message stream may be referred to as ordered message delivery.

In the application server of the invention there is a special type of message referred to as the stream membership change message. This message is received by every node that is associated with the message stream as part of the message order, in the same way as any other message. The content of the membership change message is such that nodes associated with a message stream may know of any new member nodes and any nodes that are no longer members of the message stream.

In the application server of the invention it is preferred that each node in the cluster and distributed application server are members of a special message stream referred to as the cluster membership message stream 410. Therefore the membership of a particular message stream is a subset of the membership of the special cluster membership message stream.

Changes in the membership of any of the other message streams will be driven by changes in the membership of the special cluster membership message stream 410. So, if a new node is added to the cluster and therefore becomes a member of the cluster membership message stream 410 then the new cluster node is likely to be assigned membership to one or more of the other message streams also. Similarly, if a node on the cluster fails or is removed from the cluster, that node will therefore no longer be a member of the cluster membership message stream. In this case the node's membership in all other message streams with which it was associated will also be terminated.

While a single node may be a member of more than one message stream in addition to the cluster membership stream 310, the failure of any node will only affect those message streams (other than the cluster membership stream) of which the node is a member. Other streams (other than the cluster membership stream) are unaffected. As all members in the cluster and therefore in the message streams are peers it is relatively simple to associate and delete nodes from a message stream dynamically.

With the configuration described above the distributed application server of the invention is able to detect the failure of members in the configuration and be reconfigured dynamically whilst preserving the integrity of the messages in the message streams.

Figure 5:
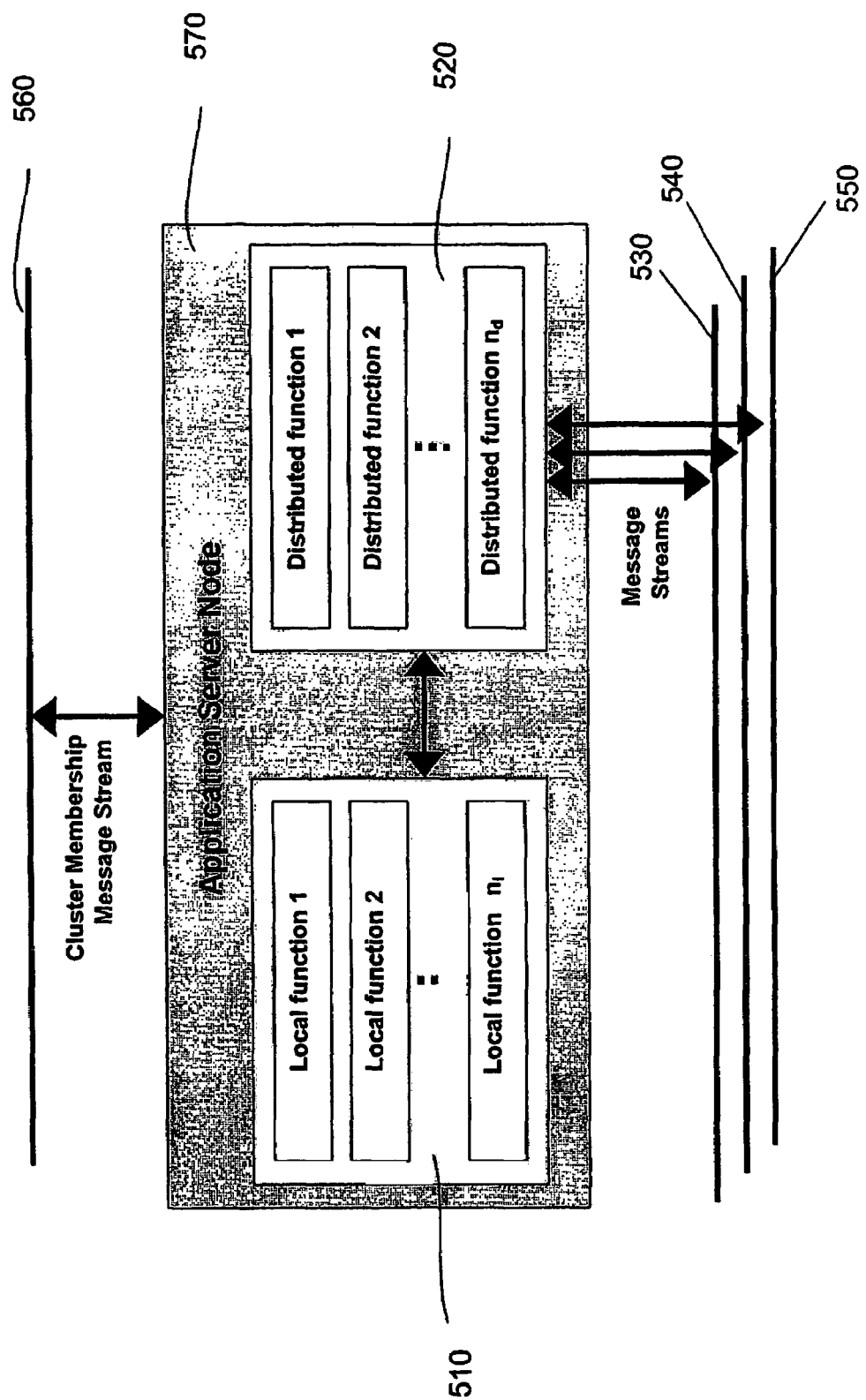
FIG. 5 is a diagram illustrating the relationships between local functions on an application server node, distributed functions and message streams in accordance with the invention.

FIG. 5 illustrates the relationship between local functions 510 on an application server node, distributed functions 520 on the application server and the message streams 530, 540, 550 and 560 described above in accordance with the invention.

Each node for example 570 is preferably identical and provides the same set of functions as every other node in the application server cluster, the functions available on a node typically being comprised of one or more software components. For example, each node in the application server could include the same set of local functions.

Local functions 510 are functions that can be initiated and completed on a single one of the cluster nodes without co-operation with any other node.

In the application server of the invention it is preferred that local functions are implemented using deterministic algorithms. That is, an algorithm in which no randomisation is used in any decision made by the algorithm. Deterministic algorithms are particularly preferred for the invention because they guarantee that with identical input the algorithm will always produce identical results. It is important that every node that performs a function based on particular input should produce the same output as every other node that performs the same function based on the same input.

Distributed functions 520 are functions that require co-operation between the nodes on at least one of the message streams to produce a desired result.

Figure 6:
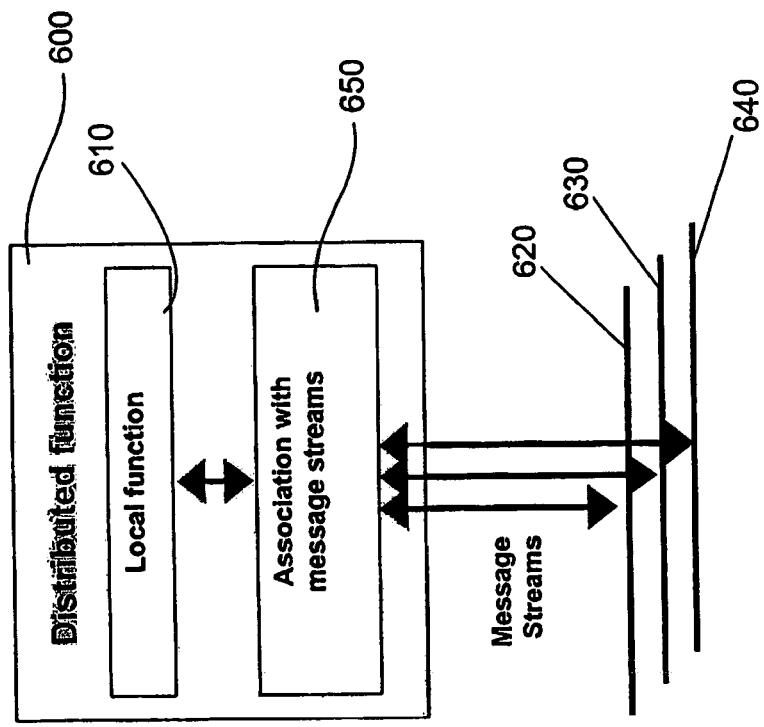
FIG. 6 is a diagram illustrating the composition of a distributed function as implemented in the invention.

As illustrated in FIG. 6, a distributed function 600 will usually be comprised of two parts. The first part is at least one local function 610 implemented on at least one server node, which is associated with and driven by event messages on one or more ordered message streams for example 620, 630 and 640. The second part of a distributed function is a set of associations 650 with one or more message streams by which events are received and may be sent.

Events received on the message streams constitute input to the local functions. All nodes that support the same distributed function are members of the same required message streams. The local (deterministic) functions on each node will therefore perform the same actions in the same order without any additional message exchange for the purpose of coordination.

The deterministic algorithms of the local function(s) are substantially separated from the node interaction mechanism as additional message exchange for the purpose of coordination is not required. In this way the actual implementation of the distributed function (the local function(s)) may be completely decoupled from the interactions between the nodes on the message stream.

As described above, membership change messages are delivered to all nodes that are members of a message stream as a part of the message order. The content of the membership change message is such that the implementation of the distributed function (the local function(s)) may take action that is consistent among all nodes that are members of the message stream when the membership changes, without requiring additional message exchange.

An example of a distributed function on the distributed application server of the invention is the selection of nodes for event processing. All events that are received on the server must be routed for processing. Events need to be routed in such a way that the workload on the server cluster is effectively balanced.

Load balancing is a term which generally refers to the pre-defined procedures by which workload is distributed across two or more server nodes to improve response time and/or throughput. Effective load balancing is important for improved scalability of the distributed server.

Figure 7:
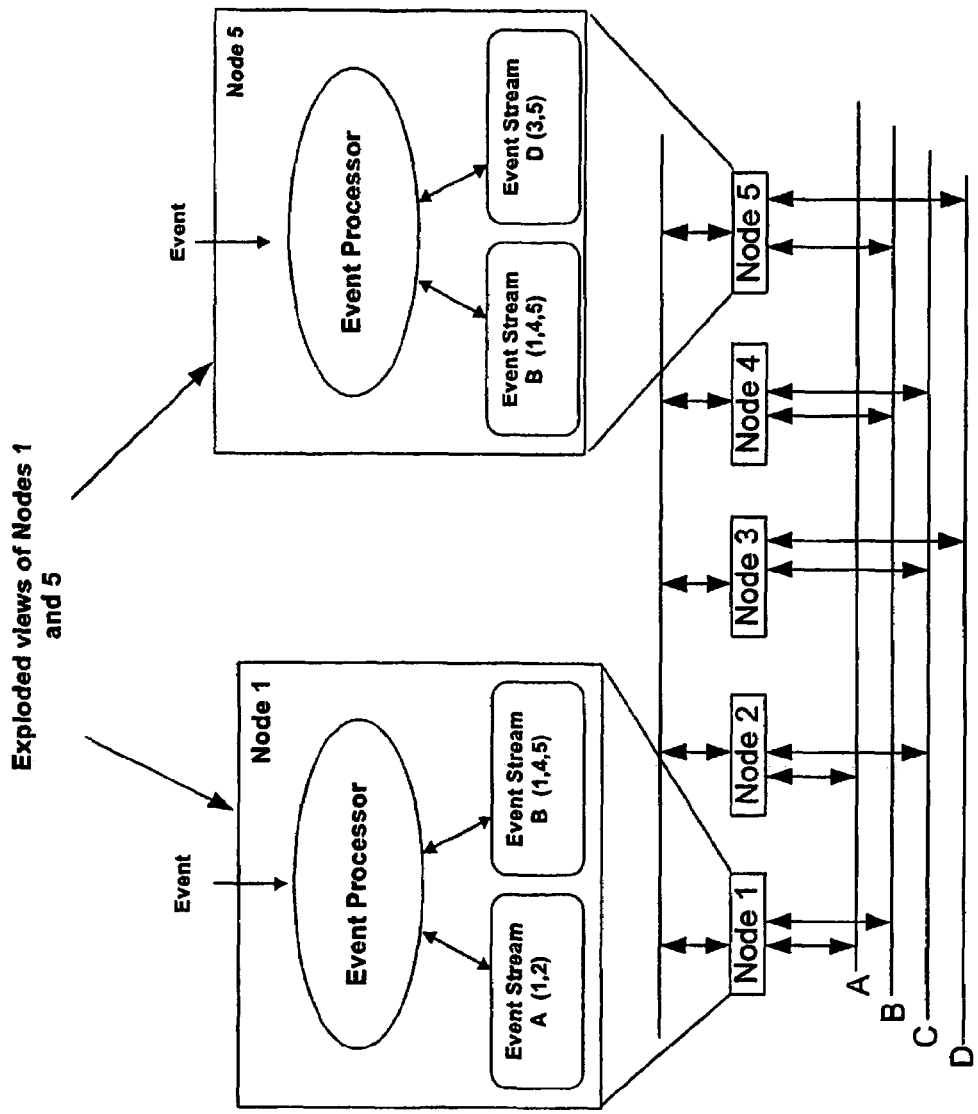
FIG. 7 illustrates some of the elements involved in the routing of events within the distributed server of FIG. 4.

FIG. 7 illustrates some of the elements involved in the routing of events within the distributed server of the invention from the point of view of two nodes (Nodes 1 and 5) from the example cluster of FIG. 4.

When a node receives an event, a message stream must be selected to handle the event. The event is then delegated for processing to the selected message stream.

If for example, Node 1 receives an event, the local event processor function(s) will determine where to route the event but they cannot do this without reference to the message stream associations.

If for example, Node 1 were to receive an event the local event processor functions on Node 1 would refer to the message stream associations. This would reveal that Node 1 is a member of Message streams A and B and would also provide information as to what other nodes are members of the message stream. In addition, each node maintains a local estimate of the load for each message stream of which it is a member. The estimate is derived from the history of events accepted and processed so far.

The association data will thus allow the local event processor functions that define rules for event processing and load balancing to determine which of the message streams to which the event should be routed. For example, the local event processor functions may implement sticky load balancing. The event message is then sent out to the members of the selected message stream. In this way the distributed functions of event routing and load balancing are implemented.

Other examples of distributed functions implemented on the distributed application server of the invention are the replication of component state (the state of hosted application components), the co-ordination of event processing success/failure, feedback based event rate limiting and co-ordination of management operations across all nodes in the application server.

The foregoing describes the invention including preferred forms thereof. Alterations and modifications as will be obvious to those skilled in the art are intended to be incorporated within the scope hereof, as defined by the accompanying claims.

What we claim is:

1. A fault-tolerant computer system including a distributed application server comprising:
   a cluster of two or more application server nodes in a peer configuration, the application server nodes deployed on one or more computing devices,
   wherein there is no single point of failure in the cluster;
   a cluster membership message stream having as membership each node; and
   one or more additional message streams, the one or more additional message streams each having as members one or more of the nodes,
   wherein each node maintains a continuous view of the membership of each message stream it is a member of, by receiving messages on the message stream that indicate changes in stream membership as nodes join and leave the cluster;
   wherein the cluster membership message stream and the one or more additional message streams each comprise a plurality of messages propagated through the associated nodes,
   wherein the application server implements a plurality of distributed functions as a set of deterministic local functions in the nodes on the application server, the local functions being associated with a set of the message streams,
   wherein each node provides the same set of functions as every other node, and
   wherein upon receipt of an event by the cluster, the cluster processes the event using distributed functions associated with the individual nodes and using local functions that determine which of the message streams the event should be assigned based on message stream associations, a local history of events accepted and processed so far, and rules for event processing and load balancing.

2. The system of claim 1 wherein messages on a particular message stream are delivered in a message order to each node associated with the message stream.

3. The system of claim 1 configured to enable one or more nodes to be dynamically added to the application server by assigning membership of the cluster membership message stream to the one or more new nodes.

4. The system of claim 1 configured to enable one or more nodes to be dynamically removed from the application server by terminating membership of the cluster membership message stream of the one or more removed nodes.

5. The system of claim 2 wherein messages indicating a change in message stream membership are delivered as part of the message order and wherein the content of the membership change message is such that the implementation of the plurality of distributed functions may take action that is consistent among all nodes that are members of the message stream when the membership changes.

6. The system of claim 1 wherein each node in the application server includes the same set of local functions.

7. A method of implementing a fault-tolerant distributed application server comprising:
   forming a cluster of two or more application server nodes in a peer configuration, wherein the application server nodes are deployed on one or more computing devices;
   assigning membership of a cluster membership message stream to each node;
   assigning membership of one or more additional message streams to one or more of the nodes; and
   implementing a plurality of distributed functions as a set of deterministic local functions in the nodes on the application server, the local functions being associated with a set of the message streams;
   eliminating any single point of failure by implementing the same set of functions on each peer node in the cluster; and
   processing events received by the cluster by using the plurality of distributed functions associated with the individual nodes,
   wherein the cluster membership message stream and the one or more additional message streams each comprise a plurality of messages propagated through the associated nodes and using local functions that determine which of the message streams the event should be assigned based on message stream associations, a local history of events accepted and processed so far, and rules for event processing and load balancing.

8. The method of implementing a distributed application server of claim 7 further comprising delivering messages on a particular message stream, in a message order, to each node that is a member of the message stream.

9. The method of implementing a distributed application server of claim 8 further comprising delivering messages indicating a change in message stream membership as part of the message order and wherein the content of the membership change message is such that the implementation of the plurality of distributed functions may take action that is consistent among all nodes that are members of the message stream when the membership changes.

* * * * *